INVENTORS
Vernon M. Zwicker &
BY  Garl N. Webb

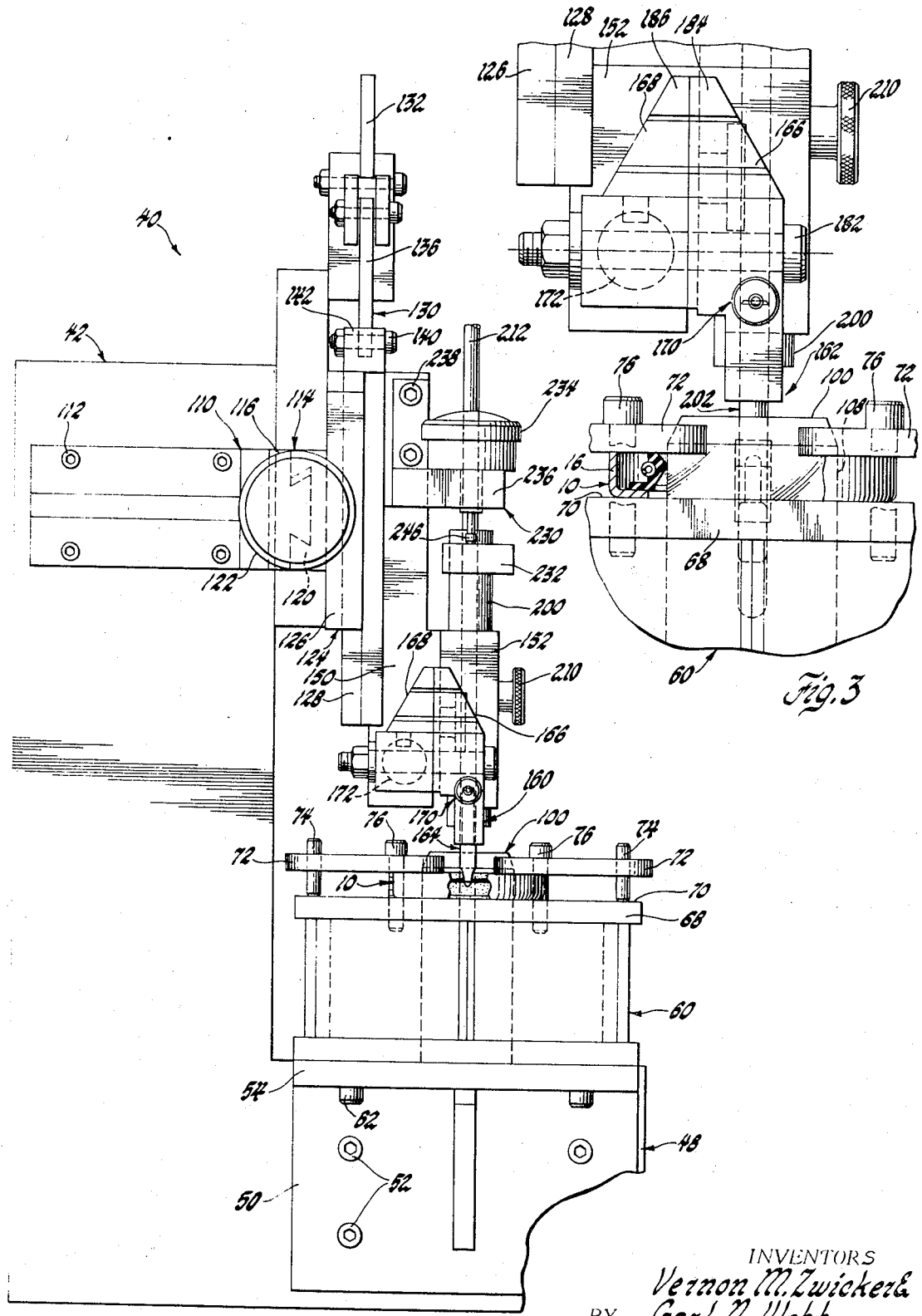

E. J. Biskup
ATTORNEY

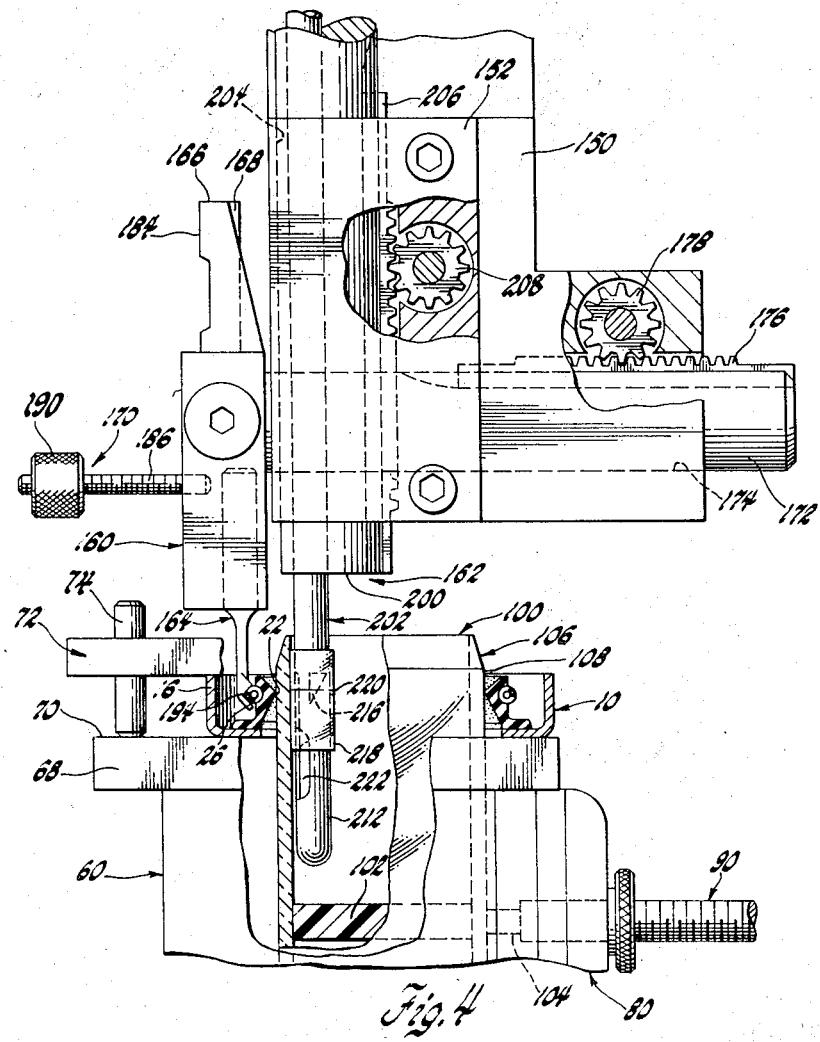

United States Patent Office 3,538,610
Patented Nov. 10, 1970

3,538,610
LIP SEAL R-VALUE GAUGE
Vernon M. Zwicker and Garl N. Webb, Indianapolis, Ind., assignors to General Motors Corporation, Detroit, Mich., a corporation of Delaware
Filed Oct. 21, 1968, Ser. No. 769,226
Int. Cl. G01b 3/30
U.S. Cl. 33—180                              7 Claims

ABSTRACT OF THE DISCLOSURE

A gauge for nondestructively measuring the R-value of a lip seal having a garter spring inwardly biasing a flexible seal lip wherein the seal is mounted over a transparent sleeve with the seal lip engaging the outer diameter thereof and a first reference device is axially aligned with the center of the garter spring and a second reference device having optical sight means is inserted through the sleeve and aligned at the center of the contact path between the seal lip and the sleeve. A differential indicating device is connected between the first reference device and the second reference device to measure the relative axial distance between the spring and the seal lip or, the R-value for the seal.

In fluid seals of the type having a coiled spring radially inwardly biasing a seal lip, one of the parameters which must be closely controlled to establish optimum sealing capability is the seal R-value. As commonly applied, the R-value denotes the axial distance between a plane through the axis of the spring and a plane through the center of the seal lip. In a properly designed lip seal, a fluid film is established at the seal lip-shaft interface during periods of relative rotation. The fluid film has a maximum pressure adjacent the fluid side edge of the seal lip and a zero or minimum pressure at the air side edge. Therefore, the spring position should be located on the air side of the seal lip in order to facilitate the formation of the film and establish a maximum lip pressure at the air side edge. Due to manufacturing variations, however, the spring position cannot be precisely controlled and a tolerance must be set for the R-value.

The effects of an improper R-value is most pronounced insofar as seal lip wear and elastomeric decomposition are concerned. For instance, as the position of the spring approaches the seal lip, the lip pressure distribution is similarly shifted and, at a location which is dependent on the other seal parameters, an excessive lip pressure can exist at the oil side edge which results in a breakdown of the fluid film. The operation of the seal under these conditions will result in excessive temperatures at the seal lip-shaft interface which can cause elastomeric decomposition and resulting fluid leakage. Moreover, the absence of a fluid film greatly increases the friction between the seal lip and the shaft thereby accelerating seal lip wear. The increased friction can also cause a seal phenomenon known as "stick slip" wherein the seal lip momentarily adheres to the shaft due to the high torque therebetween and is wound around the shaft in the direction of shaft rotation. When the torsional resistance is overcome, the seal lip springs back and allows a flow of fluid between the rubbing surfaces. Periodically, the fluid film is gradually worn away and the torque between the seal lip and the shaft increases. When the torque again reaches a value which causes the seal lip sealing surface to become unstable, the phenomenon repeats itself. Seals operating under these conditions are likely to generate conditions of high frequency "stick slip" and will fail due to the high temperatures generated at the seal lip. The same conditions are present when the spring is located directly over or on the oil side of the seal lip.

Although the effect of an excessive R-value is less pronounced insofar as sealing capability is concerned, an overly excessive figure can result in a bowing of the seal lip that enables a wedge-shaped oil film to be formed at the interface. Under high fluid pressure conditions, the film will mechanically raise the seal lip off the shaft and permit a leakage of fluid.

Past proposals to measure this critical sealing parameter have not been entirely satisfactory inasmuch as they have required destructive testing of the lip seal. In one method, the R-value is measured by cutting a transverse section through the seal and obtaining an enlarged drawing of the lip. By knowing the spring coil outer diameter, the spring is constructed in the molded spring groove thereby locating the spring center. Then, a line is constructed normal to the axis of the seal through the spring center. By measuring from this line to the seal lip center, the R-value is determined. However, the actual or assembled R-value deffers from the free form value because the spring position will be geometrically shifted because of conventional interference between the seal lip and the shaft and, accordingly, a measurement of the R-value under operational conditions is preferred. Therefore, other methods have been directed toward measuring the R-value under simulated assembly. In one method, a seal is mounted on a shaft and encapsulated in an epoxy resin. A transverse cut is made through the lip seal and the shaft. An enlarged photograph is made of the cross section and a tapered block is inserted into the spring coil on each side of the shaft to locate the spring centers. By measuring from a line connecting these centers to the seal lip-shaft interface, the R-value for the particular seal is determined.

Because of the criticality of the R-value in establishing optimum sealing performance, it is desirable to measure this parameter on a one hundred percent (100%) basis. Accordingly, the nondestructive prior methods defeat this objective. The present invention, on the other hand, contemplates a lip seal guage wherein the R-value is easily and quickly determined by nondestructive means. This objective is accomplished by mounting the lip seal over a transparent sleeve having a diameter simulating that of a shaft on which the seal is designed to operate. A first reference device is axially and radially movable relative to the sleeve and alignable with the center of the spring. A second reference device is axially movable with respect to the sleeve and the first reference device. The second reference device comprises an optical sighting system for viewing outwardly through the sleeve and a hairline which is alignable with the sleeve-seal lip interface. A differential indicator is connected between the first and second reference devices and indicates the R-value for the test seal when the first reference device is aligned with the center of the spring and the hairline is aligned with the center of the seal lip.

Accordingly, it is an object of the present invention to provide an apparatus for nondestructively determining the R-value of a seal of the type having a spring radially biasing a flexible seal lip.

It is another object of the present invention to provide a lip seal R-value gauge for nondestructively measuring the axial distance between a plane through the center of a seal spring and a plane through the center of a seal lip wherein first and second reference means are respectively alignable with the center of the spring and the seal lip and differential indicating means are provided for measuring the axial distance between the first reference device and the second reference device thereby enabling measurement of the R-value.

It is a further object of the present invention to provide a gauge for nondestructively determining the R-value of a lip seal having a coiled spring radially inwardly biasing a flexible seal lip wherein the lip seal is mounted on a sleeve having a diameter simulating that of a rotatable shaft on which the seal is designed to operate. A first reference device is aligned with the center of the spring and a second reference device is aligned with the center of the interface between the seal lip and the sleeve. The R-value or the axial distance between the first reference device and second reference device is indicated by a differential indicator connected therebetween.

Yet another object of the present invention is to provide a gauge which nondestructively measures the R-value of a lip seal of the type having a coiled spring for radially inwardly biasing the flexible seal lip wherein the seal lip is mounted over a transparent sleeve having a diameter simulating that of a shaft on which the seal is designed to operate and a first reference device is axially aligned with the center of the spring and a second reference device is inserted through the sleeve and includes an optical sighting device that views through the sleeve and is aligned at the center of the interface between the seal lip and the sleeve. The relative axial distance between the center of the spring and the center of the seal lip is measured by an indicator connected between the first reference device and the second reference device.

These and other objects of the present invention will be apparent to one skilled in the art upon reading the following detailed description, reference being made to the accompanying drawings in which:

FIG. 2 is a front view of the gauge shown in FIG. 1;

FIG. 3 is an enlarged fragmentary view showing the alignment of the optical sighting system with the seal lip;

FIG. 4 is an enlarged partial cross-sectional view showing the measurement of the R-value;

FIG. 5 is a view similar to FIG. 4 showing the alignment of the first reference device and the second reference device;

FIG. 6 is a cross-sectional view of a lip seal mounted on a shaft;

Figure 1:
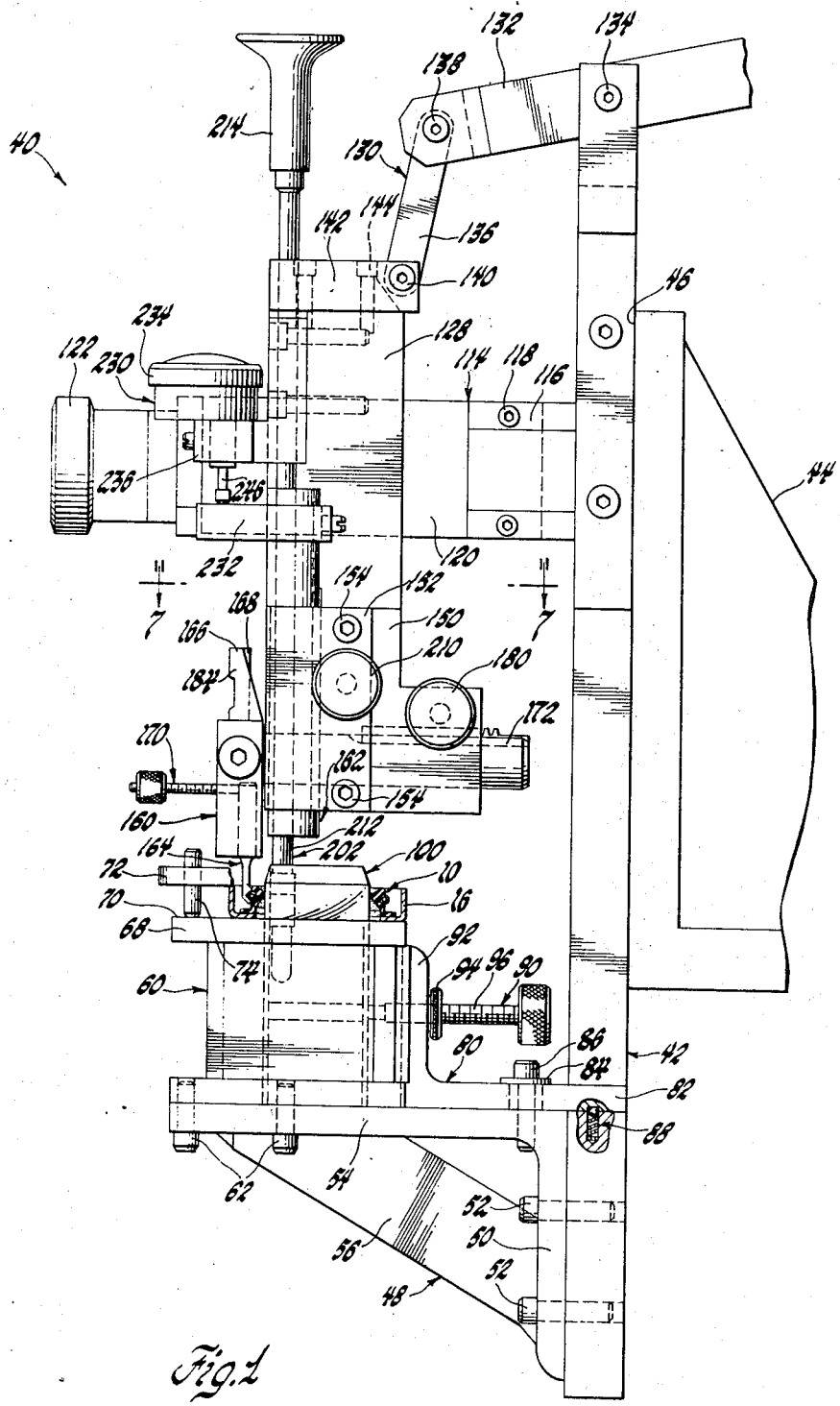
FIG. 1 is a side elevational view of a lip seal R-value gauge made in accordance with the present invention.

Referring now to the drawings and, in particular, to FIG. 6, a conventional lip seal 10 comprises an elastomeric sleeve-like sealing annulus 12 having one end 14 attached to an annular metallic casing 16. The sealing annulus 12 includes converging frustoconical walls 18 and 20 defining a radially inwardly facing seal lip 22. The wall 20 faces the fluid to be sealed and the wall 18 is spaced by the fluid by the seal lip 22 on the air side of the seal. An annular groove 24 is formed in an outwardly facing surface of the sealing annulus 12 on the air side of the seal lip 22. A coiled garter spring 26 is located within the groove for radially inwardly biasing the seal lip 22.

The lip seal 10 is designed to operate on a rotatable shaft 28 to prevent the passage of fluid past the annular interface between the seal lip 22 and the shaft 28. One of the critical parameters that determines proper performance for a given seal is the R-value, a term which is defined as the axial distance between a plane 30 through the center of the spring 26 and a plane 32 through the center of the seal lip 22 at the interface.

A gauge, generally indicated by the reference numeral 40 for measuring the R-value, is shown in FIG. 1. More specifically, the gauge 40 includes a base plate 42 that is fixedly connected to a mounting fixture 44 at a vertical surface 46. While the preferred embodiment will describe a gauge having a vertical orientation, it will hereafter become apparent that the same can be successfully mounted in a horizontal position.

Figure 7:
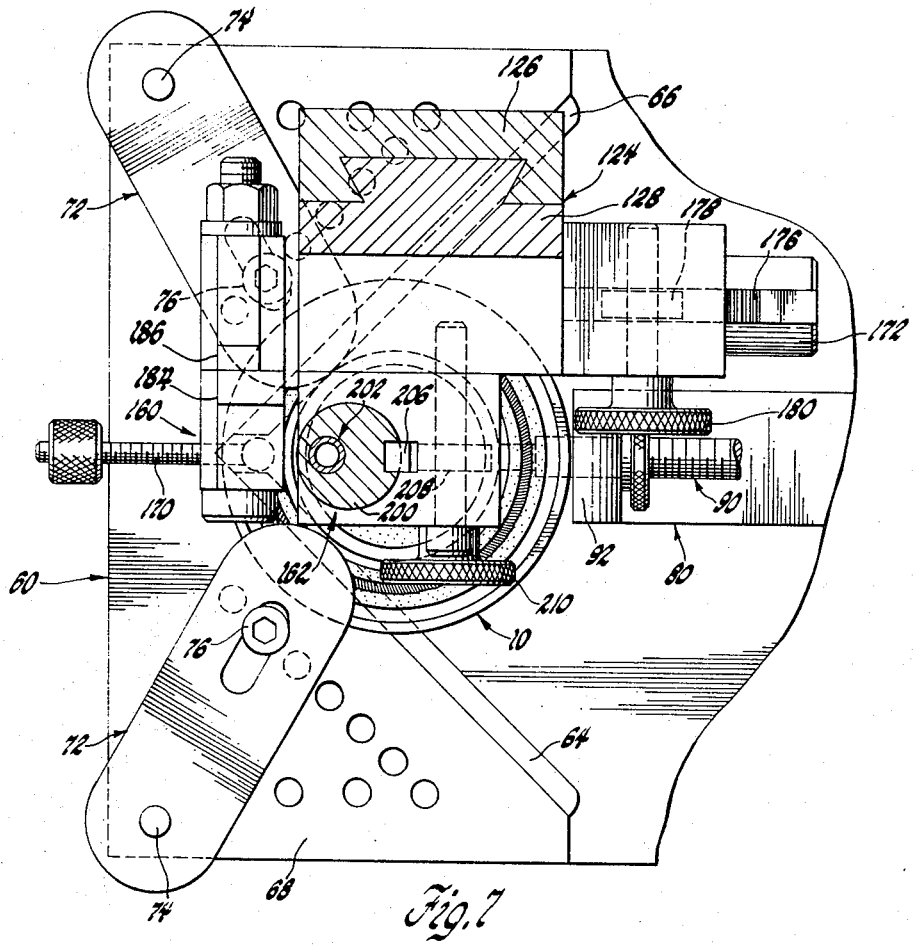
FIG. 7 is an enlarged view taken along line 7—7 of FIG. 1.

An angle plate 48 is attached at a vertical leg 50 to the base plate 42 by means of screws 52 and further includes a horizontal leg 54 and a reinforcing plate 56. A V-block 60 is fixedly connected to the upper surface of the leg 54 by means of screws 62. As shown in FIG. 7, the V-block 60 includes angled plates 64 and 66 defining a vertically extending V-shaped channel. Referring to FIG. 2, the V-block 60 includes an upper plate 68 having a horizontal mounting surface 70. As shown in FIG. 7, a pair of clamps 72 are adjustably connected to the upper plate 68 by a pivot pin 74 and a screw 76.

Referring to FIG. 1, an L-shaped bracket 80 is pivotally connected at a lower leg 82 to the angle plate 48 by a bushing 84 and a screw 86. The bracket 80 is detented in the illustrated position by a spring and ball detent assembly 88. A thumb screw 90 is threaded through a vertical leg 92 of bracket 80. A locking nut 94 is threaded over a shank 96 of the thumb screw 90 and serves to lock the latter to the bracket 80.

As shown in FIG. 4, a cylindrical sleeve 100 formed of a transparent material such as glass or plastic is received within the V-shaped channel of the V-block 60 and includes a centrally disposed reinforcing disc 102. A resilient tip 104 of the thumb screw 90 engages the outer surface of the sleeve 100 at the disc 102 to lock the sleeve 100 against the angled plates 64 and 66. It will be appreciated that the thumb screw 90 and the detent assembly 88 facilitate insertion and removal of sleeves having varying diameters and thereby permit the testing of seals of various sizes. The sleeve 100 further includes a conical entrance surface 106 and an outer surface 108 having a diameter simulating that of the shaft on which the seal 10 is designed to operate.

Referring to FIG. 2, an angle plate 110 is fixedly secured to the upper end of the base plate 42 by means of fasteners 112. As shown in FIG. 1, a conventional machine slide 114 is secured to the angle plate 110 at a fixed slide 116 by fasteners 118. The machine slide 114 includes a movable slide 120 that is selectively positioned in a horizontal or radial plane relative to the sleeve 100 and the mounting surface 70 by means of an adjusting knob 122.

Referring to FIG. 2, a second machine slide 124 is fixedly connected at a fixed slide 126 to the movable slide 120 of the first machine slide 114. A movable slide 128 is selectively positioned in an axial direct or vertical plane by an actuator 130. As shown in FIG. 1, the actuator 130 includes an operating handle 132 pivotally connected at a midportion to the upper end of the base plate 42 at a pin connection 134. The upper end of the operating handle 132 is pivotally connected to one end of a connecting link 136 at a pin connection 138. The other end of the connecting link 136 is pivotally connected at a pin connection 140 to an end plate 142 that is fixedly connected to the movable slide 128 by fasterners 144. Accordingly, upon movement of the operating handle 132, the movable slide 128 is axially positioned with respect to the sleeve 100 and vertically with respect to the mounting surface 70.

Referring to FIG. 1, a carriage member including a first block 150 and a second block 152 are fixedly connected to the movable slide 128 by screws 154. As shown in FIG. 4, the first block 150 adustably supports a first reference device 160 and the second block 152 adjustably supports a second reference device 162.

The first reference device 160 as shown in FIG. 4 generally comprises a probe 164, a pair of relatively pivotable alignment plates 166 and 168, a counterweight assembly 170, and a shaft 172. The shaft 172 is slidably received within a radially extending bore 174 formed in the first block 150. A rack 176 is axially attached to the shaft 172 and drivingly engages a rotatable pinion 178. Referring to FIG. 7, the pinion 178 is rotatably connected to an adusting knob 180. Accordingly, upon rotation of the adusting knob 180, the pinion 178 drives the rack 176 and the shaft 172 in a horizontal plane to thereby radially position the first reference device 160. Referring to FIG. 3, the alignment plate 166 is pivotally connected to the fixed alignment plate 168 by a horizontal pin connection 182. The alignment plates 166 and 168 include planar gauging surfaces 184 and 186, respectively, which are vertically aligned when the probe 164 is perpendicular to the mounting surface 70. The counterweight assembly 170 as shown in FIG. 4 includes an adjusting screw 188 fixed to the alignment plate 166 and an adjusting nut 190. The counterweight assembly 170 serves to accurately align the gauging surfaces 184 and 186 in a vertical position.

Referring to FIG. 5, the upper end of the probe 164 is fixedly connected to the alignment plate 166 and the lower end includes a V-shaped notch 192 having an apex 194. The notch 192 should be of sufficient size to accommodate various spring sizes and permit the apex 194 to be accurately aligned with the center of the spring.

Referring to FIG. 4, the second reference device 162 generally comprises a cylindrical bar 200 and an optical scope 202. The bar 200 is slidably received within a vertical bore 204 formed in the block 152. A rack 206 is attached to the bar 200 and drivingly engages a rotatable pinion 208. As shown in FIG. 7, the pinion 208 is rotatably connected to an adjusting knob 210. Thus, as the adjusting knob 210 is rotated, the pinion 208 axially drives the rack 206 and the bar 200 to position the scope 202 in a vertical plane.

The optical scope 202 is a commercially available optical sighting system that enables an operator to view at right angles to the light of sight. More specifically, the scope 202 comprises a tubular shaft 212 having an optical eyepiece 214 attached at an upper end. As shown in FIG. 4, a right angle prism 216 is positioned adjacent an opening formed in the lower end of the shaft 212. A plastic sleeve 218 is fitted over the end of the shaft 212 and includes a hairline 220 axially positioned at the prism 216. Accordingly, by viewing through the eyepiece 214, the operator can sight right angles through the prism 216 outwardly in a radial plane past the hairline 220. A light source 222 is provided to illuminate the field of view.

Figure 8:
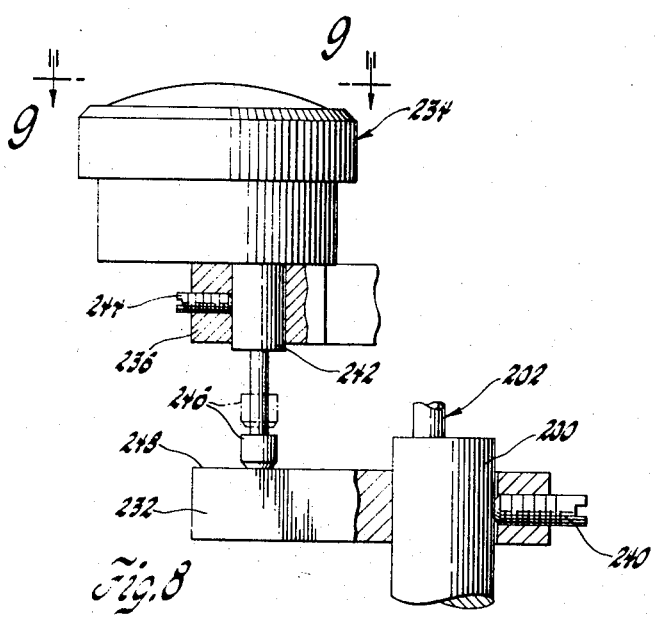
FIG. 8 is an enlarged side view of the indicator of the present invention.
Figure 9:
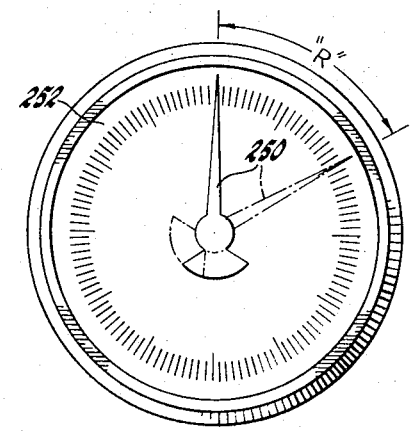
FIG. 9 is a view taken along line 9—9 of FIG. 8.

Referring to FIG. 2, a differential indicating device 230 is mounted between the bar 200 and the base plate 42 and generally comprises a shiftable reference plate 232, a dial indicator 234, and a mounting bracket 236. The mounting bracket 236 is secured to the base plate 42 by means of screws 238. Referring to FIG. 8, the reference plate 232 is received over the bar 200 and is adjustably secured thereto by a screw 240. The dial indicator 234 includes a hub 242 that is inserted through a hole in the mounting bracket 236 and secured therein by a screw 244. The indicator 234 includes an indicating tip 246 that engages the top surface 248 of the reference plate 232. As the indicating tip 246 is moved, and as shown in FIG. 9, an indicator needle 250 is rotated with respect to graduations formed on an indicator dial 252.

OPERATION

To measure the R-value of the seal 10, the latter is pressed over the sleeve 100 until the casing 16 engages the mounting surface 70. The screws 76 are tightened to urge the clamps 72 against casing 16 and thereby lock the latter against mounting surface 70 with the seal lip 22 engaging the outer surface 108 of the plastic sleeve 100.

As shown in FIG. 5, the first reference device 160 and the second reference device 162 are shifted by means of the actuator 130 in a retracted position and the hairline 220 is aligned with the apex 194 of the probe 164. This alignment is accomplished by axially moving the optical scope 202 relative to the first reference device by means of the adjusting knob 210. In this position, the counterweight assembly 170 is adjusted until the gauging surfaces 184 are vertically aligned as shown in FIG .7. This alignment will position the indicator needle 250 in the solid line position shown in FIG. 9. After alignment of the apex 194 with the hairline 220, the first reference device 160 and the second reference device 162 are moved axially by means of the operating handle 132 until the apex 194 is axially located with respect to the garter spring 26. Then, the first reference device 160 is radially positioned relative to the spring 26 by the pinion 178 and the rack 176 until the gauging surfaces 184 are vertically aligned. Because of the V-shaped notch, the apex 194 will be aligned with the axis of the spring 26.

Next, by sighting through the optical scope 202, the hairline 220 is selectively moved by the pinion 208 and the rack 206 until the hairline 220 is in line with the center of the seal lip 22. In other words, the viewer sights through the optical scope 202 at right angles through the transparent plastic sleeve 100 and adjusts the position of the hairline 220 until the latter is centered with respect to the contact interface between the outer surface 108 and the seal lip 22. The scope 202 is focused at the interface by selective adjustment of the adjusting knob 122. As shown in FIG. 8, this adjusting operation will move reference plate 232 and shift the indicator point 246 to the position shown by the phantom lines. This, in turn, will cause a radial displacement of the indicator needle 250 to the dotted line position shown in FIG. 9. The difference between the two settings will be the R-value of the tested seal.

Those skilled in the art will appreciate that many modifications can be made to achieve the many features described above and permit non-destructive determination of the lip seal R-value. In the event an indication merely of acceptance or rejection for a particular seal is desired, the above described differential indicating means can be replaced by an electrical sensing device. Similarly, the first reference device 160 and the second reference device 162 can be modified to provide an equivalence of function— namely, a physical alignment with the centers of the spring and the seal lip. For instance, a dial indicator can be used to show when a first reference device is positioned at the axis of the spring. Moreover, the plastic sleeve can be provided with a plurality of graduations to indicate the difference between the position of the spring and the center of the seal lip.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. An apparatus for nondestructively determining the R-value of a seal having a flexible seal lip and a spring for radially biasing the seal lip, said R-value being the axial distance between a plane through the center of the spring and a plane through the center of the seal lip, said apparatus comprising: a sleeve having a surface simulating that of a rotatable member on which the lip seal is designed to operate, said seal being received on said sleeve with said seal lip engaging said surface of said sleeve; first reference means axially movable relative to said sleeve and alignable with said center of said spring; second reference means axially movable with respect to said sleeve and said first reference means and alignable with said center of said seal lip; and means operatively associated with said first reference means and said second reference means for indicating the relative axial distance therebetween.

2. A gauge for nondestructively determining the R-value of a lip seal having an annular coiled spring radially inwardly biasing a flexible seal lip wherein said R-value is the axial distance between a plane through the center of the spring and a plane through the center of the seal lip, said gauge comprising: a fixture; a transparent sleeve removably connected to the fixture and having an outer diameter simulating that of a rotatable shaft on which the lip seal is designed to operate, said lip seal being received over said sleeve with said seal lip engaging said outer diameter at an annular interface; first reference means alignable with the center of said spring and axially and radially movable relative to said fixture; second reference means including an optical sighting system axially movable with respect to said sleeve and said first reference means, said optical sighting system permitting sighting through said sleeve and alignment with the center of said seal lip at said interface; and differential means connected between said first reference means and said second reference means for indicating the relative axial distance therebetween when said optical sighting system is aligned with the center of said seal lip and said first reference means is aligned with the center of said spring.

3. A lip seal gauge for nondestructively determining the R-value of lip seals of various sizes, said lip seal having an annular coiled spring radially inwardly biasing a flexible seal lip which is adapted to sealingly engage a rotating shaft wherein the R-value is the axial distance between a plane through the center of the coiled spring and a plane through the center of the seal lip, said lip seal gauge comprising: a cylindrical sleeve formed of a transparent material having an outer diameter simulating that of said rotating shaft; a fixture on which said sleeve is releasably mounted, said fixture accommodating a plurality of sleeve diameters to permit testing of lip seals having varying sizes, said lip seal being received over said sleeve with said seal lip engaging said outer diameter at an annular interface; first reference means axially and radially movable relative to said sleeve and including probe means alignable with the center of said spring; second reference means including an optical sighting system having a hairline, said hairline being axially movable with respect to said sleeve and said first reference means into alignment with the center of said seal lip at said interface by viewing outwardly through said sleeve with said optical sighting system; and differential means referenced to said probe means and said hairline for indicating the relative axial distance therebetween and the R-value of said seal when the probe means are aligned with the center of the spring and said hairline is aligned with the center of said seal lip.

4. A nondestructive lip seal gauge for measuring the R-value of lip seals of various sizes, said lip seal comprising a flexible sealing annulus attached to an annular casing and having a seal lip which is adapted to sealingly engage a rotating shaft wherein the R-value is the axial distance between a plane through the center of a coiled spring which serves to radially inwardly bias said seal lip and a plane through the center of said seal lip, said lip seal gauge comprising: a fixture having a planar mounting surface; a cylindrical transparent sleeve releasably mounted on said fixture normal to said mounting surface, said fixture accommodating a plurality of sleeve diameters to permit testing of lip seals having varying sizes, said lip seal being received over said sleeve with said casing engaging said mounting surface and said seal lip engaging said outer diameter of said sleeve; a carriage member adjustably connected to said fixture for axial and radial movement relative to said mounting surface; a first reference device carried by said carriage member and axially and radially movable relative to said mounting surface and said sleeve; a probe connected to the first reference device and including a V-shaped notch having an apex that is alignable with the center of said spring; a second reference device carried by said carriage member and independently axially movable relative to said mounting surface and said sleeve; an optical sighting system connected to said second reference device, said sighting system having a hairline for indicating alignment with the center of said seal lip by viewing outwardly through said sleeve with said optical sighting system; and an indicator referenced to said apex at said hairline for measuring the relative axial distance therebetween and the R-value of said seal when said apex is aligned with the center of said spring and said hairline is aligned with the center of said seal lip.

5. A lip seal gauge as recited in claim 4 wherein said probe is pivotally connected to said first reference device and the latter includes gauging surfaces for indicating when the probe is aligned normal to the mounting surface.

6. The lip seal gauge as recited in claim 5 wherein said first indicating device includes a counterweight assembly for aligning said gauging surfaces.

7. The lip seal gauge as recited in claim 6 wherein said first reference device and said second reference device are movable relative to said carriage member by rack and pinion drives.

References Cited
UNITED STATES PATENTS 2,331,987 10/1943 Leatherman.
2,594,077 4/1952 Schulze.
3,106,781 10/1963 Eisele.

FOREIGN PATENTS 925,847 5/1963 Great Britain.

WILLIAM D. MARTIN, JR., Primary Examiner

U.S. Cl. X.R.

33—46, 147, 174